US006026309A

United States Patent [19]

Moon et al.

[11] Patent Number: 6,026,309
[45] Date of Patent: Feb. 15, 2000

[54] APPARATUS AND METHOD FOR VISUALLY MONITORING STATUS OF A TELEPHONE CALL ON A PORTABLE INTELLIGENT COMMUNICATIONS DEVICE

[75] Inventors: Billy G. Moon, Apex; Manon Baratt, Cary, both of N.C.

[73] Assignee: Ericsson Inc., Research Triangle Park, N.C.

[21] Appl. No.: 08/955,910

[22] Filed: Oct. 22, 1997

[51] Int. Cl.[7] ............................ H04Q 7/00; G06F 165/00
[52] U.S. Cl. ......................... 455/566; 455/550; 455/566; 455/403; 455/422; 455/412; 701/200; 701/208; 701/212; 701/216
[58] Field of Search ..................................... 455/566, 575, 455/90, 456, 457; 345/329, 330, 331, 332, 977; 379/45, 122; 340/825.36, 825.49

[56] References Cited

U.S. PATENT DOCUMENTS

| | | | |
|---|---|---|---|
| 4,502,123 | 2/1985 | Minami et al. | 364/424 |
| 5,471,525 | 11/1995 | Domoto et al. | 379/247 |
| 5,515,285 | 5/1996 | Garrett, Sr. et al. | 364/460 |
| 5,559,707 | 9/1996 | DeLorme et al. | 364/443 |
| 5,848,373 | 12/1998 | Delorme et al. | 701/200 |
| 5,852,783 | 12/1998 | Tabe et al. | 455/550 |
| 5,867,795 | 2/1999 | Novis et al. | 455/566 |

*Primary Examiner*—David R. Hudspeth
*Assistant Examiner*—Meless Zewdu
*Attorney, Agent, or Firm*—Davidson & Gribbell, LLP

[57] ABSTRACT

A method and apparatus for visually monitoring the status of a phone call initiated by a portable intelligent communications device including the steps of displaying a graphical image on a display screen of the portable intelligent communications device and depicting on the graphical image a current status of the phone call. The graphical image is a geographical map and the method further includes the steps of depicting a current location of the portable intelligent communications device on the graphical image, depicting the destination location of the phone call on the graphical image, and depicting progressive connection of the phone call to a destination location on the graphical image. Additionally, the method may also include the steps of depicting one of the portable intelligent communications device location and the destination location as a disconnecting location for the phone call on the graphical image, depicting progressive disconnection of the phone call from the disconnecting location to the other location, and depicting the other location as being disconnected from the phone call. Color coding may be utilized to distinguish between when the phone call is either connected or disconnected at the portable intelligent communications device location and the destination location.

30 Claims, 7 Drawing Sheets

APPARATUS AND METHOD FOR VISUALLY MONITORING STATUS OF A TELEPHONE CALL ON A PORTABLE INTELLIGENT COMMUNICATIONS DEVICE

BACKGROUND OF THE INVENTION

1. Field of the Invention

The present invention relates generally to a portable intelligent communications device and, more particularly, to an apparatus and method for visually monitoring the status of a telephone call on such a portable intelligent communications device.

2. Description of Related Art

A new class of communication devices has been developed which includes a full computer integrated with the communications hardware and software. These devices, known as portable intelligent communications devices, differ significantly from personal digital assistants (PDAs) and handheld personal computers (HPCs) in that they are designed extensively to be a communications device rather than merely a "mobile computer." As such, the top features for the communications device are telephony, enhanced telephony, messaging, and information services. In order to enable at least some of these features, the communications device is able to be connected to the Internet by either a wired link or a wireless link. It will also be understood that certain software applications are provided within the portable intelligent communications device to facilitate the aforementioned features, as well as other desirable features such as a Personal Information Manager (PIM), games, and the like. An exemplary portable intelligent communications device is shown and disclosed in a patent application entitled "Switching Of Analog Signals In Mobile Computing Devices" and having Ser. No. 08/796,119, which is owned by the assignee of the present invention and is hereby incorporated by reference.

It will be understood that the aforementioned portable intelligent communications device is targeted to the traveling business person. Due to the time required to connect calls, particularly with respect to remote locations, it is oftentimes helpful for the user to know the current status of a phone call. To the extent prior solutions have existed, they have involved drop down lists or tables, which are inherently cumbersome and inefficient. Thus, it would be desirable for a communications device to provide some manner of easily monitoring the status of a phone call.

Accordingly, it is a primary object of the present invention to provide an apparatus and method in a portable intelligent communications device for monitoring the status of a phone call from the portable intelligent communications device to a destination location.

It is another object of the present invention to provide an apparatus and method in a portable intelligent communications device for visually monitoring the status of a phone call being connected.

It is still another object of the present invention to provide an apparatus and method in a portable intelligent communications device having color coding for visually monitoring the status of a phone call being connected.

Yet another object of the present invention is to provide an apparatus and method in a portable intelligent communications device for visually monitoring the status of a phone call being disconnected.

These objects and other features of the present invention will become more readily apparent upon reference to the following description when taken in conjunction with the following drawings.

SUMMARY OF THE INVENTION

In accordance with a first aspect of the present invention, a method of visually monitoring the status of a phone call initiated by a portable intelligent communications device is disclosed. This method includes the steps of displaying a graphical image on a display screen of the portable intelligent communications device and depicting on the graphical image a current status of the phone call. The graphical image is a geographical map and the method further includes the steps of depicting a current location of the portable intelligent communications device on the graphical image, depicting the destination location of the phone call on the graphical image, and depicting progressive connection of the phone call to a destination location on the graphical image. Additionally, the method may also include the steps of depicting one of the portable intelligent communications device location and the destination location as a disconnecting location for the phone call on the graphical image, depicting progressive disconnection of the phone call from the disconnecting location to the other location, and depicting the other location as being disconnected from the phone call. Color coding may be utilized to distinguish between when the phone call is either connected or disconnected at the portable intelligent communications device location and the destination location.

In accordance with a second aspect of the present invention, a portable intelligent communications device is disclosed as including circuitry for performing telephony operations, a processing circuit, a display screen coupled to the processing circuit, and a graphical image displayed on the display screen. The processing circuit is responsive to the telephony circuitry so as to depict on the graphical image a current status of a phone call. In this way, the processing circuit causes a current location of the portable intelligent communications device to be depicted on the graphical image, the destination location of the phone call to be depicted on the graphical image, progressive connection of the phone call to the destination location to be depicted on the graphical image, and progressive disconnection of the phone call to be depicted on the graphical image.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
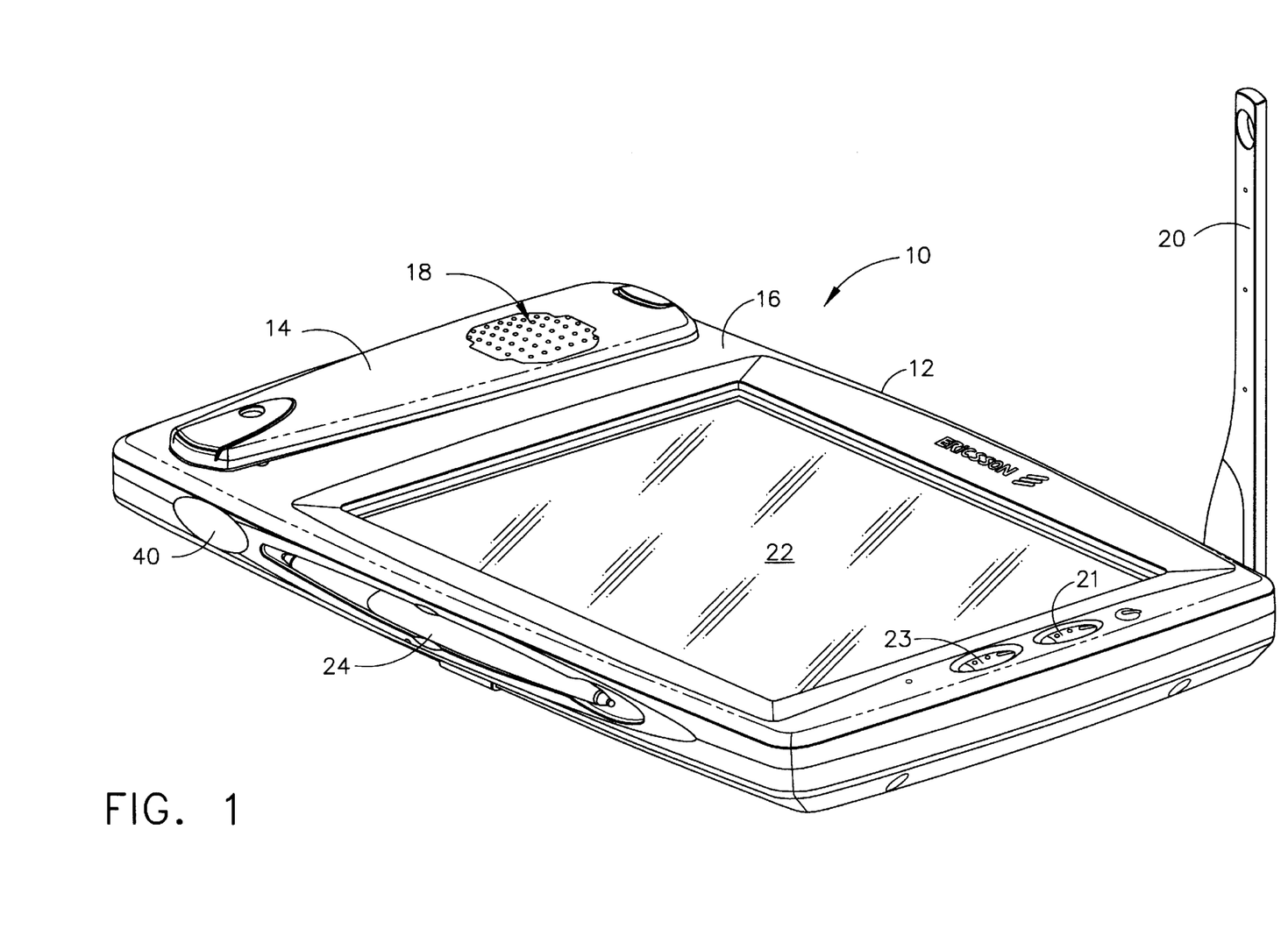
FIG. 1 is a perspective view of a portable intelligent communications device.

Referring now to the drawings in detail, wherein identical numerals indicate the same elements throughout the figures, FIG. 1 depicts a portable intelligent communications device identified generally by the numeral 10. It will be understood that portable intelligent communications device 10 is principally a communications device and includes circuitry and components which allows it to function in such capacity through cellular, landline, infrared data association (IrDA), phone cards, and other modes. Portable intelligent communications device 10 also includes circuitry which enables it to function in the capacity of a computer and a plurality of software applications may be utilized therewith. Because of this combination, portable intelligent communications device 10 is uniquely suited to provide visual displays which represent certain communications features and functionality. In this regard, it will be understood that portable intelligent communications device 10 generally operates in accordance with a device shown and described in a patent application entitled "Switching Of Analog Signals In Mobile Computing Devices" and having Ser. No. 08/796,119, which is also owned by the assignee of the present invention and is hereby incorporated by reference.

As seen in FIG. 1, portable intelligent communications device 10 includes a casing 12 for housing the communications and other circuitry as will be discussed in greater detail hereinafter. A handset 14 is positioned within a top portion 16 of casing 12 and preferably includes a built-in speaker 18 for use when handset 14 is maintained there. A pivotable antenna 20 (shown in FIG. 1 in the open or use position) is provided to enable a communications function, as when portable intelligent communications device 10 is operated in the cellular mode. It will be understood that various ports, jacks, and interfaces will be provided along the sides of casing 12 to further enable communications by portable intelligent communications device 10. Control buttons 21 and 23 are also shown as being located on top portion 16 of casing 12.

Portable intelligent communications device 10 further includes a display screen 22, which preferably is a type in which a user of the device is able to interact through touching designated areas thereon. It will be appreciated that a stylus 24 may optionally be utilized to indicate a particular area more specifically than can be accomplished with the user's finger, although most designated areas are sized for touch interaction by a typically sized finger. Since portable intelligent communications device 10 preferably is no larger than a standard business desk telephone, display screen 22 is sized to be approximately eight (8) inches measured diagonally across. This puts screen display 22 in a distinct size class, as it is smaller than normal monitor sizes for personal and portable computers and larger than screen displays for personal digital assistants (PDAs), calculators, and other similar personal electronic devices.

Figure 2:
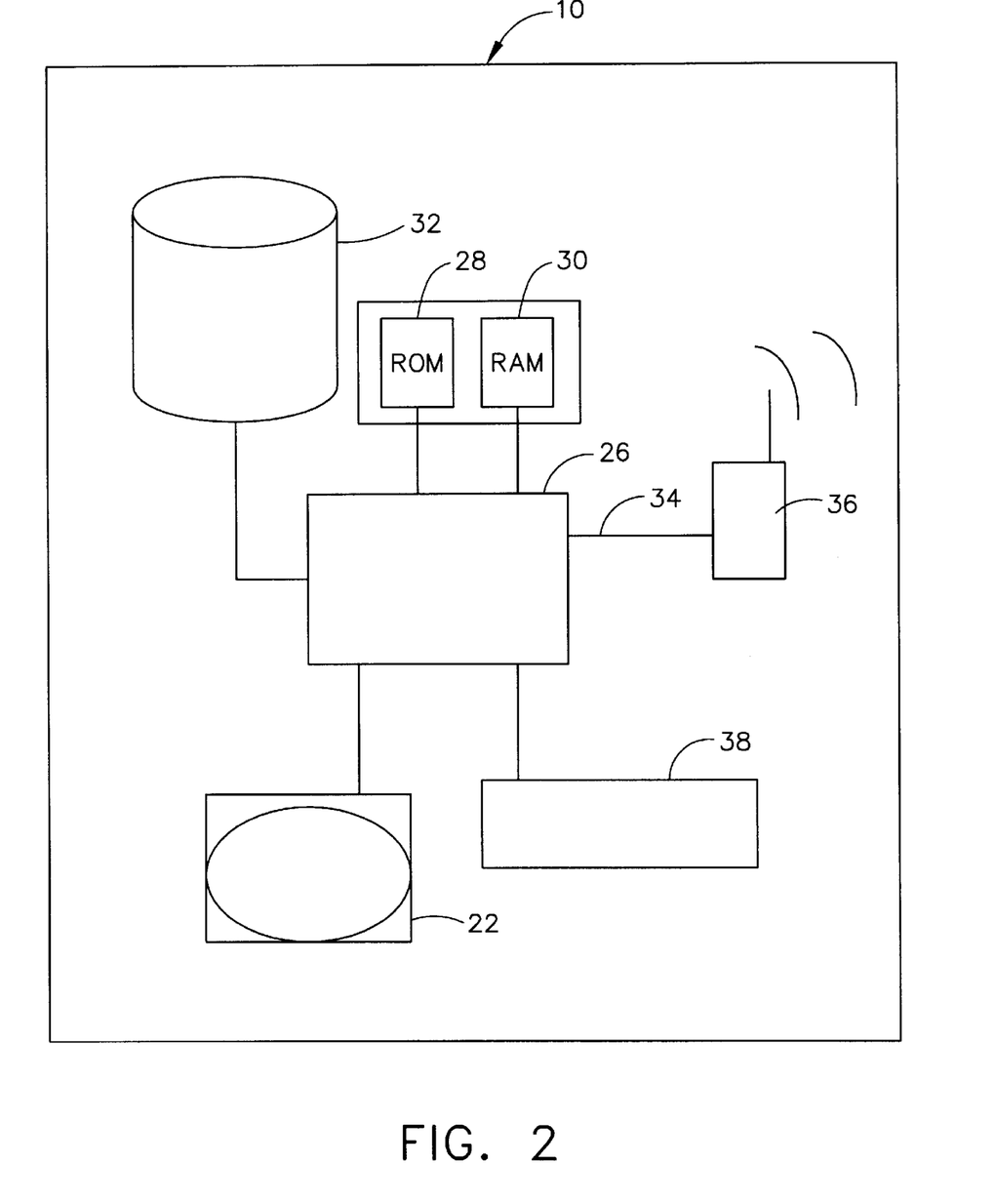
FIG. 2 is a simplified high level block diagram of the portable intelligent communications device depicted in FIG. 1.

Turning to FIG. 2, the internal circuitry of portable intelligent communications device 10 includes a processing circuit 26, which may, for example, be a Motorola microprocessor known by the designation Power PC 821. It will be seen that processing circuit 26 is connected to both Read Only Memory (ROM) 28 and Random Access Memory (RAM) 30 in which both operating systems and software applications are stored. An optional bulk storage device 32 is further provided for storing databases. Processing circuit 26 is also coupled to display screen 22 through a standard driver (not shown) in order to control the images displayed thereon, as well as receive information through graphical user interfaces in which the user of portable intelligent communications device 10 may indicate chosen options. The communications functions of portable intelligent communications device 10 are also handled through processing circuit 26 via a serial and/or parallel port 34 to the particular circuitry of a chosen communications mode designated generically by reference numeral 36. As noted hereinabove, there are several communication mode options available, including cellular, landline, IrDA, and phone cards, and it will be appreciated that more than one such option may be utilized at a given time. A keyboard 38 may also be preferably connected to processing circuit 26, where keyboard 38 can be depicted on display screen 22 or be a separate physical package which can be utilized with portable intelligent communications device 10 such as through a keyboard IR port 40 (see FIG. 1).

Figure 3:
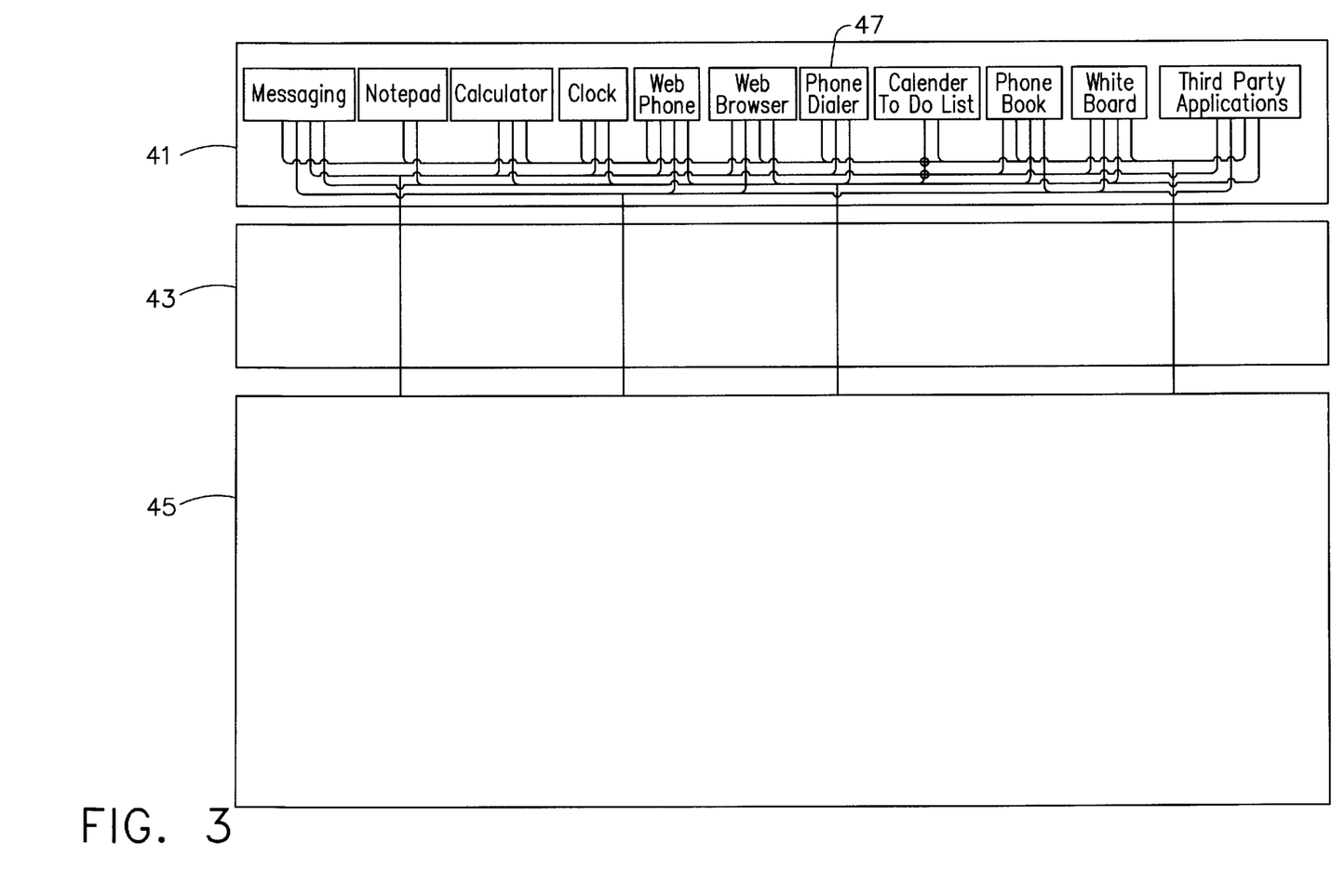
FIG. 3 is a block diagram of the software architecture for the portable intelligent communications device depicted in FIGS. 1 and 2 which includes certain software applications in accordance with the present invention.

FIG. 3 depicts a schematic block diagram of the software architecture for portable intelligent communications device 10. As seen therein, the software is divided into three basic areas: applications software 41, desktop software 43, and system operating software 45 (which includes everything else from the class libraries down to the device drivers for portable intelligent communications device 10). It will be understood that neither applications software 41 nor desktop software 43 will ever interact with anything other than the top layer of system operating software 45. Exemplary software applications are shown within applications software 41, with particular reference being made to phone dialer software application 47.

Figure 4:
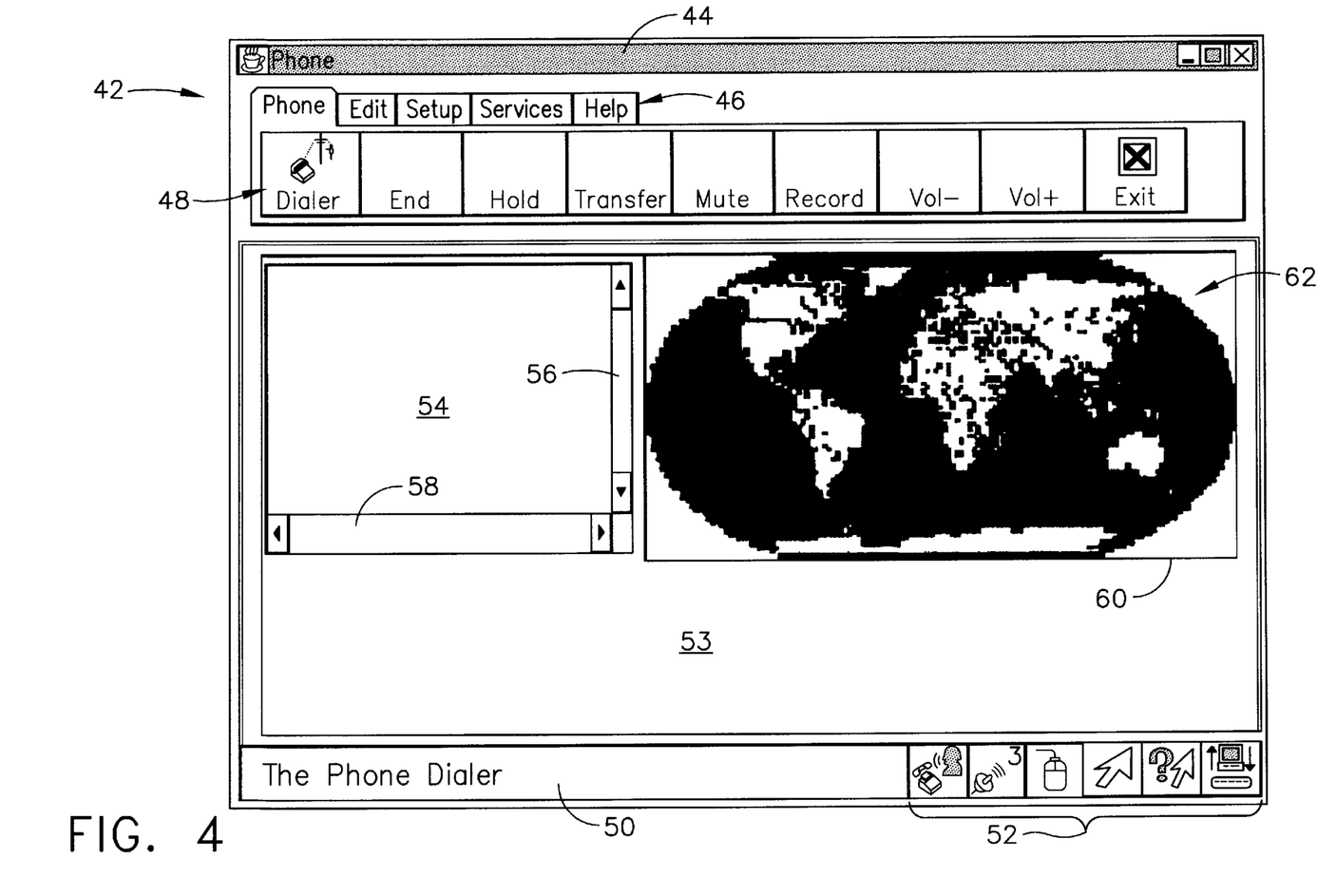
FIG. 4 is a screen display for a phone dialer software application operating on the portable intelligent communications device of FIGS. 1 and 2 which includes a defined work area therein.

FIG. 4 illustrates an exemplary screen display 42 shown on display screen 22 when portable intelligent communications device 10 operates within phone dialer software application, although it will be appreciated that similar screen displays are available through other software applications of applications software 41 operated by portable intelligent communications device 10. It will be noted that screen display 42 includes a title bar 44 located in a top window, as well as standard control buttons located along the right-hand side of title bar 44. A main control panel 46 is shown as including a plurality of tabbed areas, from which a second level of menu choices or control buttons (identified collectively by the numeral 48) appear after selection of one of the tabs in main control panel 46. A bottom rectangular area 50 of screen display 42 is preferably used to display status information and may include one or more mouse-mode control buttons 52.

It will further be appreciated that screen display 42 includes a window otherwise known as a work area 53. As seen in FIG. 4, work area 53 includes a first sub-area 54 for locating a history of recent phone calls made by portable intelligent communications device 10. It will be understood that history area 54 is preferably able to contain a listing of recently dialed phone numbers (e.g., up to approximately twenty such phone numbers), from which a user of portable intelligent communications device 10 is able to initiate a phone call by selecting a desired phone number. History area 54 may include a vertical scroll bar 56 and a horizontal scroll bar 58 so as to manipulate the phone call listings therein.

Figure 5:
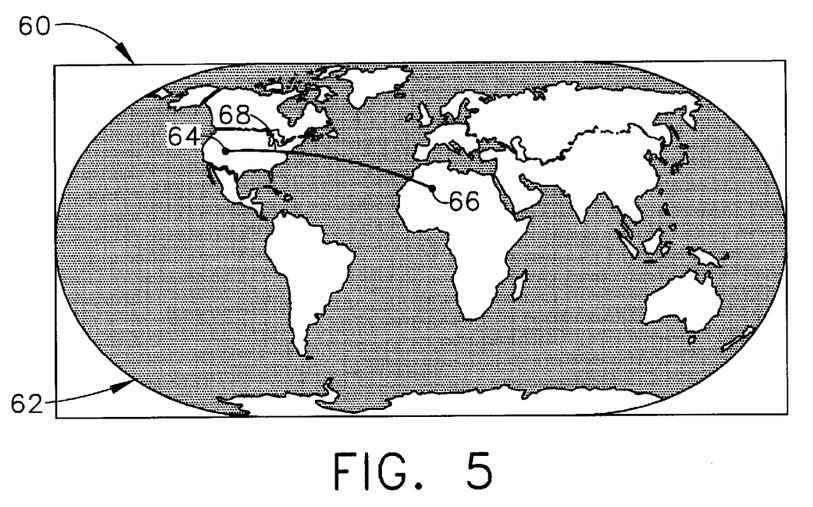
FIG. 5 is an enlarged view of a separate sub-area within the work area depicted in FIG. 3, where the sub-area contains a graphical image for visually monitoring the status of a phone call between the portable intelligent communications device and a destination location in accordance with the present invention.
Figure 8:
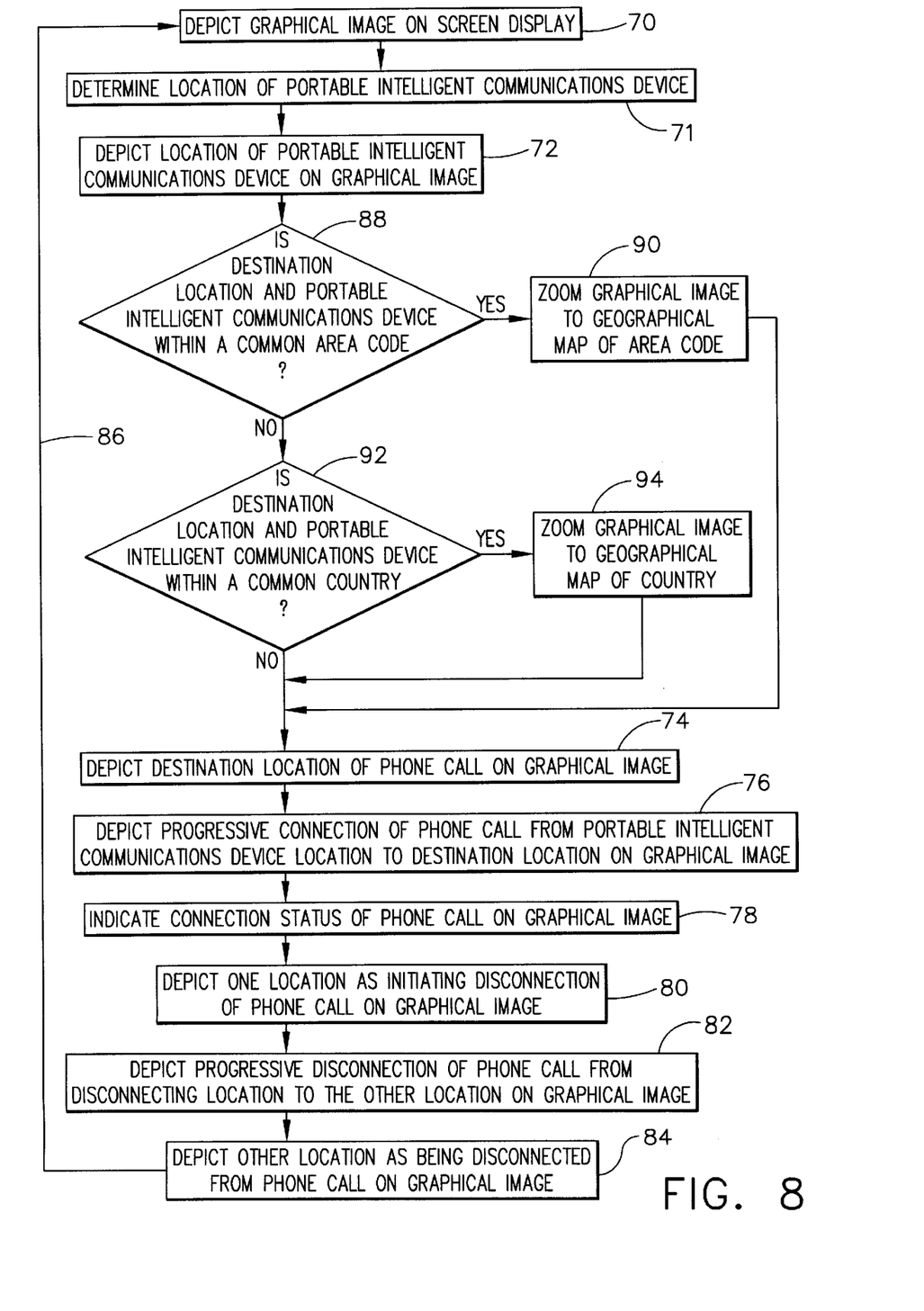
FIG. 8 is a flow chart of the process for visually monitoring the connection and disconnection of a phone call via the graphical images of FIGS. 4–6.

As shown in FIG. 5 and illustrated by the steps described in the flow chart of FIG. 8, the present invention involves a method in which a graphical image 62, preferably in the form of a world map, is depicted within a second sub-area 60 of screen display work area 53 (see box 70 of FIG. 8). In accordance therewith, various depictions are made on graphical image 62 to reflect the status of a phone call made by portable intelligent communications device 10. In this way, a user of portable intelligent communications device 10 is able to visually monitor the status of such a phone call.

More specifically, the current location of portable intelligent communications device 10 is determined (box 71) and depicted on graphical image 62 by means of a reference point 64 (box 72). It will be understood that the location of portable intelligent communications device 10 may be determined through a global positioning satellite (GPS) or mapping a particular cell site utilized by portable intelligent communications device 10 to a particular geographical location as is known in the art, or alternatively by examining a forward control channel utilized by portable intelligent communications device 10 for sending call information to a switch as disclosed in a patent application entitled "Apparatus And Method For Automatically Configuring Settings Of A Software Application In A Portable Intelligent Communications Device," filed concurrently herewith and having Ser. No. 08/955,974, which is also owned by the assignee of the present invention and is hereby incorporated by reference.

Once initiation of the phone call to the destination location occurs, a reference point 66 is depicted on graphical image 62 (box 74). Then, as the phone call is progressively connected from the location of portable intelligent communications device 10 to the destination location, depiction of the phone call connection as it progresses is depicted on graphical image 62 by an arc 68 or other similar connection of reference points 64 and 66 (box 76). In order to distinguish between the initiation of the phone call connection and when connection actually takes place, it is preferred that arc 68 and/or reference point 66 be color coded, i.e., red until the connection is completed and green thereafter (box 78). It will be understood that the status of a phone call as shown in FIG. 5 is one where connection is completed, and that the discrete steps described above will preferably be continuously updated (including, for example, graphical image 62 depicting the progressive completion of arc 68 by arc segments).

Likewise, graphical image 62 may be utilized to indicate the progressive disconnection of a phone call on portable intelligent communications device 10. In this situation, one of either portable intelligent communications device 10 or the destination location will be first to hang up and it will be considered the disconnecting location (box 80). Accordingly, the reference point representing such disconnecting location will reflect this state by changing color (e.g., from green to red), flashing, or some other distinguishable manner. Next, arc 68 will change color as disconnection of the phone call progresses (box 82), and then finally the reference point of the other (or non-disconnecting) location is shown as being disconnected (box 84). After a brief time period, the reference point representing the non-disconnecting location will preferably disappear. As indicated by feedback loop 86 in FIG. 8, this process will begin again upon initiation of another phone call by portable intelligent communications device 10.

Figure 6:
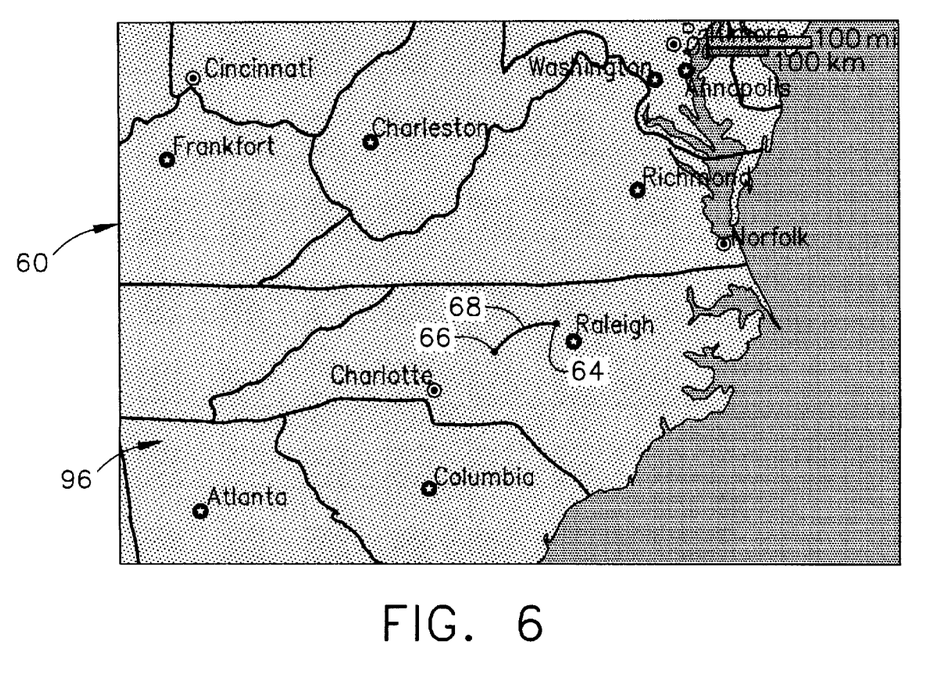
FIG. 6 is an enlarged view of a separate sub-area within the work area depicted in FIG. 3, where the sub-area contains a graphical image for visually monitoring the status of a phone call between the portable intelligent communications device and a destination location within a common area code.
Figure 7:
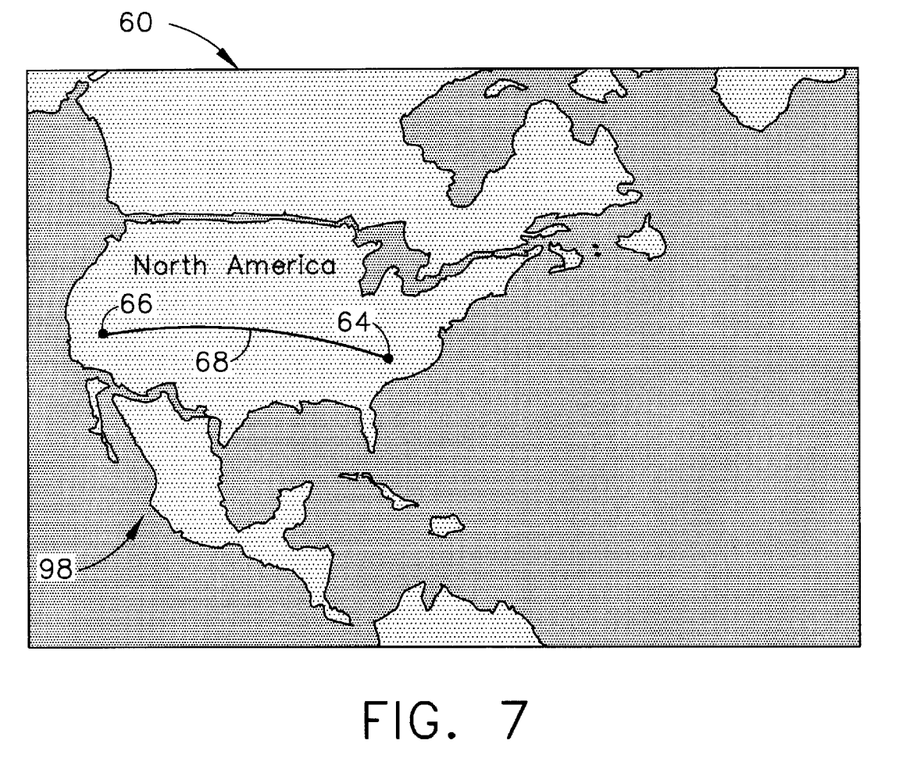
FIG. 7 is an enlarged view of a separate sub-area within the work area depicted in FIG. 3, where the sub-area contains a graphical image for visually monitoring the status of a phone call between the portable intelligent communications device and a destination location within a common country.

It will be understood from the depiction of sub-area 60 in FIGS. 6 and 7 that, while the process steps discussed above will still be applicable, graphical image 62 will be somewhat different depending on the respective locations of portable intelligent communications device 10 and the destination location for the phone call. Since arc 68 connecting portable intelligent communications device 10 and the destination location would be somewhat short and difficult to see on graphical image 62 for the case where they are each located in the same country, region, or city and graphical image 62 is a world map, it is preferred that graphical image 62 automatically zoom in to a map of greater resolution in such instances. For example, portable intelligent communications device 10 is able to determine whether the destination location for a phone call is within the same country and/or area code as portable intelligent communications device 10 by the length of the phone number dialed (e.g., additional digits must be entered for international and other long distance calls than for local calls).

It will be seen in FIG. 8 that the process illustrated preferably includes the step of determining whether the destination location is within the same area code as portable intelligent communications device 10 (see decision box 88). If the answer is yes, then graphical image 62 is automatically zoomed in to a geographical map of greater resolution for that location, such as a city, county, or other region as seen in FIG. 6 (box 90). If the answer is no, then processing circuit 26 determines whether the destination location is within the same country as portable intelligent communications device (decision box 92). Similarly, if the answer to this query is yes, graphical image 62 is automatically zoomed in to a geographical map of such country (see FIG. 7) having greater resolution than the world map initially depicted (box 94). Otherwise, the world map is utilized for graphical image 62 and the process continues as described above.

It will be noted in FIGS. 6 and 7 that reference points 64 and 66 are provided to represent portable intelligent communications device 10 and the destination location as denoted hereinabove, but such reference points along with arc 68 will be shown on graphical images 96 and 98, respectively, where a geographical map of greater resolution is depicted. Otherwise, the basic process for depicting the status of a phone call on graphical image 62 will remain the same.

It will be appreciated that processing circuit 26 provides graphical image 62 shown in screen display 60 from ROM 28 and interacts with communications circuitry 36 through RAM 30 in order to present the status of a phone call on display screen 22 of portable intelligent communications device 10. In this way, status of the phone call is continuously updated and kept current.

Having shown and described the preferred embodiment of the present invention, further adaptations of the apparatus and method for visually monitoring the status of a telephone call on a portable intelligent communications device can be accomplished by appropriate modifications by one of ordinary skill in the art without departing from the scope of the invention.

What is claimed is:

1. A method of visually monitoring the status of a phone call initiate by a portable intelligent communications device, comprising the following steps:
   (a) displaying a graphical image of a geographical map on a display screen of said portable intelligent communications device;
   (b) depicting on said graphical image a current location of said portable intelligent communications device, a destination location for said phone call, and progressive connection of said phone call from said portable intelligent communication device location to said destination location.

2. The method of claim 1, wherein an arc from said portable intelligent communications device location to said destination location is gradually completed.

3. The method of claim 2, wherein the depictions of said portable intelligent communications location, said progressive connection of said phone call, and said destination location are color coded to distinguish between when said phone call is initiated and when said phone call is connected to said destination location.

4. The method of claim 3, further comprising the step of depicting progressive disconnection of said phone call on said graphical image.

5. The method of claim 4, further comprising the step of depicting one of said portable intelligent communications device location and said destination location as a disconnecting location on said graphical image.

6. The method of claim 5, wherein a first reference point depicting said disconnecting location changes color.

7. The method of claim 5, further comprising the step of depicting progressive disconnection of said phone call from said disconnecting location to the other location on said graphical image.

8. The method of claim 7, wherein an arc from said disconnecting location to the other location changes color as said phone call is gradually disconnected.

9. The method of claim 7, further comprising the step of depicting the other location as being disconnected from said phone call on said graphical image.

10. The method of claim 9, wherein a second reference point depicting the other location changes color.

11. The method of claim 10, wherein said second reference point disappears after a designated time period.

12. The method of claim 1, wherein said graphical image is a world map.

13. The method of claim 3, further comprising the step of determining whether said portable intelligent communications device and said destination location are each located within a common area code.

14. The method of claim 13, further comprising the step of zooming said graphical image to a geographical map of greater resolution containing said area code.

15. The method of claim 3, further comprising the step of determining whether said portable intelligent communications device and said destination location are each located within a common country.

16. The method of claim 18, further comprising the step of zooming said graphical image to a geographical map of greater resolution containing said country.

17. A portable intelligent communications device, comprising:
   (a) circuitry for performing telephone operations;
   (b) a processing circuit;
   (c) a display screen coupled to said processing circuit; and
   (d) a graphical image in the form of a geographical map displayed on said display screen;
      wherein said processing circuit is responsive to said telephony circuitry so as to depict a current location of said portable intelligent communications device, a destination location for said phone call, and progressive connection of said phone call from said portable intelligent communications device location to said destination location on said graphical image.

18. The portable intelligent communications device of claim 17, wherein an arc from said portable intelligent communications device location to said destination location is gradually completed.

19. The portable intelligent communications device of claim 18, wherein the depictions of said portable intelligent communications device location, said progressive connection of said phone call, and said destination location are color coded to distinguish between when said phone call is initiated and when said phone call is connected.

20. The portable intelligent communications device of claim 18, wherein said processing circuit causes progressive disconnection of said phone call to be depicted on said graphical image.

21. The portable intelligent communications device of claim 20, wherein said processing circuit causes one of said portable intelligent communications device location and said destination location to be depicted as a disconnecting location for said phone call on said graphical image.

22. The portable intelligent communications device of claim 21, wherein a first reference point depicting said disconnecting location changes color.

23. The portable intelligent communications device of claim 21, wherein said processing circuit causes progressive disconnection of said phone call from said disconnecting location to the other location to be depicted on said graphical image.

24. The portable intelligent communications device of claim 23, wherein an arc from said disconnecting location to the other location changes color as said phone call is gradually disconnected.

25. The portable intelligent communications device of claim 23, wherein said processing circuit causes disconnection of the other location from said phone call to be depicted on said graphical image.

26. The portable intelligent communications device of claim 25, wherein a second reference point depicting the other location changes color.

27. The portable intelligent communications device of claim 26, wherein said second reference point disappears after a designated time period.

28. The portable intelligent communications device of claim 17, wherein said graphical image is a world map.

29. The portable intelligent communications device of claim 22, wherein said processing circuit causes said graphical image to automatically zoom in to a geographical map of greater resolution when said portable intelligent communications device and said destination location are in a common area code.

30. The portable intelligent communications device of claim 22, wherein said processing circuit causes said graphical image to automatically zoom in to a geographical map of greater resolution when said portable intelligent communications device and said destination location are in a common country.

* * * * *

UNITED STATES PATENT AND TRADEMARK OFFICE
CERTIFICATE OF CORRECTION

PATENT NO.  : 6,026,309
DATED       : February 15, 2000
INVENTOR(S) : Billy G. Moon, Manon Baratt It is certified that error appears in the above-identified patent and that said Letters Patent is hereby corrected as shown below:

Column 7, claim 1,
Line 3, delete [initiate] and insert initiated.

Claim 13,
Line 48, delete [3] and insert 1.

Claim 15,
Line 55, delete [3] and insert 1.

Claim 16,
Line 59, delete [18] and insert 15.

Claim 17,
Line 64, delete [telephone] and insert telephony.

Column 8, claim 29,
Line 54, delete [22] and insert 17.

Claim 30,
Line 60, delete [22] and insert 17.

Signed and Sealed this

Fourth Day of September, 2001

Attest:

*Nicholas P. Godici*

NICHOLAS P. GODICI
*Acting Director of the United States Patent and Trademark Office*

*Attesting Officer*